US009869319B2

(12) United States Patent
Mekota et al.

(10) Patent No.: US 9,869,319 B2
(45) Date of Patent: Jan. 16, 2018

(54) VACUUM PUMP (71) Applicant: Pfeiffer Vacuum GmbH, Asslar (DE)

(72) Inventors: Mirko Mekota, Ehringshausen (DE); Jan Hofmann, Gruenberg (DE); Uwe Leib, Weilburg (DE); Michael Schill, Asslar-Bechlingen (DE); Bernhard Koch, Barig-Selbenhausen (DE)

(73) Assignee: Pfeiffer Vacuum GmbH, Asslar (DE)

( * ) Notice: Subject to any disclaimer, the term of this patent is extended or adjusted under 35 U.S.C. 154(b) by 425 days.

(21) Appl. No.: 14/338,891

(22) Filed: Jul. 23, 2014

(65) Prior Publication Data

US 2015/0030475 A1    Jan. 29, 2015

(30) Foreign Application Priority Data

Jul. 26, 2013   (DE) .................. 10 2013 214 662

(51) Int. Cl.
*F04D 25/02* (2006.01)
*H02K 1/20* (2006.01)
*F04D 19/04* (2006.01)
*F04D 25/08* (2006.01)
*F04D 29/52* (2006.01)

(52) U.S. Cl.
CPC ........... *F04D 25/02* (2013.01); *F04D 19/044* (2013.01); *F04D 19/046* (2013.01); *F04D 25/082* (2013.01); *F04D 29/522* (2013.01); *H02K 1/20* (2013.01)

(58) Field of Classification Search
CPC .... F04D 19/028; F04D 19/042; F04D 19/044; F04D 19/046; F04D 25/02; F04D 25/082; F04D 29/522; F04D 29/5806; H02K 9/00; H02K 9/005; H02K 9/19; H02K 1/20
See application file for complete search history.

(56) References Cited

U.S. PATENT DOCUMENTS

| 5,331,238 | A | * | 7/1994 | Johnsen | ................. | H02K 1/185 |
| | | | | | | 310/216.049 |
| 5,633,543 | A | * | 5/1997 | Jarczynski | ............... | H02K 1/20 |
| | | | | | | 310/59 |
| 5,662,456 | A | * | 9/1997 | Englander | ............... | F04D 19/04 |
| | | | | | | 415/229 |
| 5,695,316 | A | | 12/1997 | Schuetz | | |

(Continued)

FOREIGN PATENT DOCUMENTS

JP    2014-037809    2/2014

OTHER PUBLICATIONS

Search Report of the German Patent Office.

*Primary Examiner* — Devon Kramer
*Assistant Examiner* — Joseph Herrmann
(74) *Attorney, Agent, or Firm* — Abelman, Frayne & Schwab (57) ABSTRACT

A vacuum pump includes a pump inlet, a pump outlet, a rotor rotatable about an axis of rotation, at least one process gas pump stage for conveying a process gas present at the pump inlet from the pump inlet to the pump outlet, a motor space, and a drive motor which is arranged in the motor space, is configured for rotationally driving the rotor and which has a motor stator, wherein at least one gas path is provided for the process gas from the pump inlet to the pump outlet which leads through the motor space and which leads at least sectionally along the motor stator or through the motor stator.

20 Claims, 7 Drawing Sheets (56) References Cited

U.S. PATENT DOCUMENTS

| | | |
|---|---|---|
| 6,179,573 B1 * | 1/2001 | Hablanian ............... F04D 19/04 |
| | | 415/90 |
| 6,641,376 B1 * | 11/2003 | Englander ............. F04D 17/168 |
| | | 415/119 |
| 6,793,466 B2 | 1/2004 | Miyamoto |
| 6,905,306 B2 * | 6/2005 | Englander ............... F04D 19/04 |
| | | 415/200 |
| 7,354,254 B2 | 4/2008 | Gotta |
| 2008/0253903 A1 | 10/2008 | Hablanian |

* cited by examiner

VACUUM PUMP

BACKGROUND OF THE INVENTION

1. Field of the Invention

The present invention relates to a vacuum pump having a pump inlet, a pump outlet, a rotor rotatable about an axis of rotation and at least one process gas pump stage for conveying a process gas present at the pump inlet.

2. Description of the Prior Art

Vacuum pumps are used in different technical areas, for example in semiconductor manufacture, to provide a vacuum required for a respective process. A vacuum pump typically comprises a motor space and a drive motor which is arranged in the motor space, which is configured for the rotating driving of the rotor and which comprises a motor stator.

In known vacuum pumps, the process gas is conducted past the motor space from the inlet to the outlet of the vacuum pump. Additional conveyor structures and further measures are required for this gas conduction which increase the complexity of the pump structure, the effort required for the manufacture of the vacuum pump and the construction space of the vacuum pump.

It is therefore the object of the invention to provide a vacuum pump which has a simple structure, which can be realized in a small construction space and with a small manufacturing effort and which simultaneously provides a high suction power and a high compression.

SUMMARY OF THE INVENTION

The object of the invention is achieved by providing a vacuum pump having a pump inlet, a pump outlet, a rotor which can rotate about an axis of rotation, at least one process gas pump stage for conveying a process gas present at the pump inlet from the pump inlet to the pump outlet, a motor space and a drive motor which is arranged in the motor space, which is configured for the rotating driving of the rotor and which comprises a motor stator. At least one gas path is provided for the process gas from the pump inlet to the pump outlet; it leads through the motor space and at least sectionally along the motor stator or through the motor stator.

The gas conduction through the motor space and along the motor stator or through the motor stator ensures a more compact and simpler structure of the vacuum pump since the motor space itself is used as a gas-conducting or gas-conveying structure and the effort for additional gas-conducting structures is reduced. In addition, the pump outlet can be arranged at the side of the vacuum pump remote from the structures acting as pumps of the one or more process gas pump stages, at which side in principle more free construction space is available than at the side of the process gas pump stage so that a better space utilization and thereby a more compact design of the vacuum pump is ensured.

Advantageous embodiments of the invention are described in the dependent claims, in the description and in the Figures.

In accordance with an advantageous embodiment, an intermediate space is provided between the motor stator and the rotor. The at least one gas path preferably leads past the intermediate space. Since the process gas conducted past the intermediate space is not in direct contact with the rotor, an additional friction between the conveyed process gas and the rotor is avoided or is at least reduced in this region which would otherwise result in an impairment of the suction power and of the compression and in a great heating and a high power consumption of the vacuum pump due to the slim design of the intermediate space and high speeds at which the rotor rotates.

The section of the gas path conducted past the intermediate space preferably extends along the motor stator and/or through the motor stator. A favorable gas conduction past the intermediate space is thereby achieved without any substantial additional construction space requirement or manufacturing effort.

In principle, at least one further gas path which leads through the intermediate space can be provided in addition to the gas path leading past the intermediate space. It is preferred in this case if the predominant portion of the process gas conveyed through the motor space is conveyed past the intermediate space.

The intermediate space can be bounded by mutually facing sides of the motor stator and of the rotor. The intermediate space preferably comprises a motor gap, in particular a radial motor gap, which preferably extends through the motor stator in an axial direction, i.e. in the direction of the axis of rotation. The motor stator and the rotor can influence one another magnetically via the intermediate space to transfer a drive torque generated by the drive motor via the intermediate space to the rotor.

The gas path preferably extends from an inlet of the motor space through the motor space to an outlet of the motor space. The inlet and the outlet can in this respect be arranged at different sides of the intermediate space between the motor stator and the rotor. The inlet and the outlet of the motor space can be spaced apart from one another in the axial direction and can in this respect in particular be arranged above and below the intermediate space in the axial direction.

The gas path extending past the intermediate space can be oriented in an axial direction or at least have an axial direction component, in particular at least in a section extending along the motor and/or through the motor stator. The section of the gas path extending past the intermediate space and along the motor and/or through the motor stator preferably extends over the total axial length of the motor stator.

In accordance with an advantageous embodiment, one or more passages are provided through which the gas path extends past the intermediate space and which are bounded by the motor stator over a part of their periphery or over their total periphery. A channeled conducting of the gas past the intermediate space is thereby achieved with a low resistivity and a high conductance. At least one passage or each passage is preferably bound by a cut-out or opening of the motor stator. Such passages can be manufactured particularly simply since only corresponding cut-outs or openings have to be provided in the motor stator and the desired passages automatically result when the motor stator is installed in a typical fashion in the vacuum pump.

At least one passage or each passage preferably extends over the total axial length or over at least a part of the axial length of the motor stator and is bounded by the motor stator along this length.

The motor stator can have an opening, in particular a throughgoing opening, with a closed cross-section, which opening bounds the respective passage. The motor stator can also have a cut-out such as a groove which bounds the closed cross-section of the passage together with an adjacent component of the vacuum pump, for example with a part of the housing or with a reception section carrying or fixing the motor stator. Such a cut-out is preferably arranged at the radial outer side of the stator. A favorable gas conduction is possible there, on the one hand. In addition, the operation of the motor stator is only slightly influenced by the lack of material of the motor stator at the radial outer side of the motor stator due to the cut-out.

At least one passage or each passage can have an axial direction component at least over a part of its length or over its total length.

The motor stator is preferably configured to generate an electromagnetic drive field for transmitting a torque onto the rotor. The motor stator can have a core which preferably bears one or more coils of the motor stator.

The core preferably at least regionally, and in particular completely, comprises a magnetic, in particular soft-magnetic, and/or metallic material. The core can have one or more grooves in which the coils are fixed at its radial inner side. If the motor stator has a plurality of openings or cut-outs, as described above, they are preferably formed in the core of the motor stator.

The core can comprise a plurality of disks, in particular in the axial direction and stacked on one another which preferably at least regionally and in particular completely comprise a magnetic, in particular soft magnetic, and/or metallic material and which preferably form a sheet metal package of the motor stator. The sheet metal package can be a baked lacquer sheet metal package.

In accordance with an advantageous embodiment, the cut-outs or openings of the motor stator which are bounded by one or more passages are formed in the disks of the core. This embodiment can be realized with a particularly small effort since preferably only cut-outs or openings of the individual disks have to be provided to generate the desired passages. The cut-outs or openings of the disks can be generated by punching, for example. In this case, the disks can already be punched out from a blank having the desired cut-outs and openings during their manufacture so that the manufacture of the vacuum pump is possible without any substantial additional effort since the manufacture of the finished disks can in particular take place using only one punching tool.

In accordance with an advantageous embodiment, the passages are configured and/or arranged such that a substantially uniform drive torque can be generated over the total angle of rotation with respect to the axis of rotation. It is in this respect in particular avoided that a lack of material of the motor stator which is due to the cut-outs and/or openings of the motor stator results in a detent torque and thereby to an uneven running behavior of the drive motor. As described in detail in the following, the passages can be configured asymmetrically for this purpose, for example, or can be asymmetrically distributed over the periphery of the motor stator.

In accordance with an embodiment, a region of the motor stator in which no passage is arranged is disposed opposite at least one and in particular opposite every passage in the radial direction. Preferably no two passages are therefore disposed opposite one another in the radial direction. It is thereby avoided that the influence of the passages on the magnetic poles of a pole pair of the rotor, which are typically opposite one another in the radial direction, add up. Instead, a respective only one magnetic pole of a pole pair is disposed in the direct region of influence of a passage so that a uniform running behavior of the motor is achieved.

In accordance with an embodiment, an odd number of passages is provided. The passages are in this respect preferably arranged distributed substantially uniformly over the periphery of the motor stator. A summing of the influences of the passages on the running behavior of the drive motor is thereby likewise avoided and a smooth running behavior is achieved.

In accordance with a further embodiment, at least one passage and in particular each passage is oriented inclined to the axis of rotation of the drive motor over at least a part of its length and in particular over its total length. It is thereby ensured that the passage and the influence of the passage on the running behavior of the drive motor are distributed over a larger region of the angle of rotation relative to the axis of rotation so that a smooth running behavior is ensured over the total angle of rotation despite the discrete nature of the passages. In addition, the cooling of the motor stator is improved by the larger surface in the region of the passages due to the inclined orientation of the passages.

The portion of the process gas which is conveyed through the motor space and which is conveyed past the intermediate space is preferably larger than the portion of process gas—which may still be present—which is conveyed through the intermediate space. To reduce the portion of the process gas conveyed through the intermediate space, a seal can be provided for the fluid-tight sealing of the intermediate space. The seal can, for example, comprise a dynamic labyrinth seal. In addition, the intermediate space can be kept as small as possible and can, for example, comprise a particularly narrow motor gap, whereby the portion of the process gases conveyed through the intermediate space is likewise reduced. An impairment of the suction power of the pump and a heating of the pump as a consequence of the leading of the process gas through the motor space can thereby be particularly effectively avoided.

In accordance with an advantageous embodiment, a Siegbahn pump stage is provided which is configured for conveying the process gas into the motor space.

The additional Siegbahn pump stage can be realized with a relatively small effort and in a small construction space and it has been found that the additional pump action provided by the Siegbahn pump stage is suitable to compensate a reduction in the suction power of the pump due to gas friction in the intermediate space between the motor stator and the rotor so that a compact and high-performance vacuum pump is provided with simple means and having a gas conduction extending through the motor space.

The at least one gas path can extend through the intermediate space in this embodiment. The at least one gas path can also lead past the intermediate space as described above. A plurality of gas paths can also be provided which each lead through the motor space, and preferably along the motor stator or through the motor stator, with at least one gas path leading through the intermediate space and at least one gas path leading past the intermediate space.

The Siegbahn pump stage preferably has an inlet which is connected in a gas-conducting manner to the at least one process gas pump stage and an outlet which is connected in a gas-conducting manner to the motor space or to its inlet. The outlet of the Siegbahn pump stage can in this respect lead into the motor space without any interposition of further pump stages. A high pump efficiency and suction performance of the vacuum pump is thereby achieved.

The Siegbahn pump stage preferably comprises a rotor member, in particular a rotor member rotationally fixedly coupled to the rotor, which is preferably configured in disk shape. The Siegbahn pump stage can comprise a stator member which is preferably configured in disk shape. The rotor member and the stator member can each form a surface acting as a pump of the Siegbahn pump stage. The disk-shaped rotor member and/or stator member can in this respect be orientated respectively radially to the axis of rotation.

A surface acting as a pump of the Siegbahn pump stage is preferably configured with a structure and/or a surface acting as a pump of the Siegbahn pump stage is configured as even or smooth. The Siegbahn pump stage can comprise a structured surface which is preferably formed by the stator member and an even or smooth surface which is preferably formed by the rotor member. The even or smooth design of the surface acting as a pump of the rotor member has the advantage that the rotor member can be manufactured simply and that no weakening of the rotor member is necessary which could otherwise result in damage to the rotor member as a result of the centrifugal force strains occurring during the operation of the vacuum pump. The Siegbahn pump stage can in principle also comprise a rotor member having a structured surface acting as a pump and a stator member having a smooth surface acting as a pump. A so-called double thread can, however, also be provided. In this case, the surface acting as a pump of both the rotor member and of the stator member is respectively structured.

The surfaces acting as pumps preferably bound at least one conveying passage of the Siegbahn pump stage and a sealing gap for sealing the conveying passage. The conveying passage can have a spiral extent and can in particular extend in a plane radial to the axis of rotation. The sealing gap is preferably configured as an axial sealing gap. The conveying structure can, however, also extend diagonally, that is obliquely to the axis of rotation.

A region of at least one surface acting as a pump which bounds the sealing gap is or can be produced at least sectionally by a material-removing machining. A particularly good matching of the surfaces acting as pumps to one another and a particularly small gap width of the sealing gap can thereby be ensured.

In accordance with an advantageous embodiment, the rotor member simultaneously forms a rotating member of the process gas pump stage. A vacuum pump can thereby be provided which is particularly simple to manufacture and is simultaneously compact. The rotor member can, for example, be configured as a rotor disk of a process gas pump stage configured as a turbomolecular pump. The surface acting as a pump can in this respect be formed by the inner region of the rotor disk which is preferably configured as a support ring and which supports the blades of the rotor disk which preferably project from this region in a radial direction. The rotor member can also be configured as a rotor hub of a process gas pump stage in particular configured as a Holweck pump stage, a threaded pump stage or a cross-thread or double cross-thread pump stage. A plurality of pump stages can also be present at the hub.

The Siegbahn pump stage is preferably arranged within a rotor member of the process gas pump stage. The process gas pump stage preferably comprises at least one sleeve-shaped and in particular cylindrical rotor member, in particular a Holweck rotor sleeve or a sleeve of a threaded pump stage or of a cross-cylinder or double cross-cylinder thread pump stage, with the Siegbahn pump stage being arranged within the sleeve-shaped rotor member. A particularly compact construction shape of the vacuum pump is thereby achieved.

In accordance with an advantageous embodiment, the stator member of the Siegbahn pump stage is supported by a partition wall bounding the motor space or is formed by the partition wall. This embodiment can be manufactured particularly simply since no separate rotor member or no separate carrier structure for the rotor member has to be provided.

The stator member and/or the rotor member can be configured as an injection molded part as a forged part or as a shaped part.

The stator member and/or the rotor member of the Siegbahn pump stage can at least partly or completely comprise a metal, in particular aluminum, and/or the stator member and/or the rotor member can at least partly or completely comprise a plastic.

The Siegbahn pump stage is preferably configured to convey the process gas into the motor space through a gap, in particular a radial gap formed between the rotor and a partition wall bounding the motor space. This can be effected in a particularly simple manner since no separate gas-conducting connection has to be provided between the Siegbahn pump stage and the partition wall.

As described above, an intermediate space can be provided between the motor stator and the rotor.

In accordance with an embodiment, mutually oppositely disposed surfaces of the motor stator and of the rotor which bound the intermediate space form surfaces acting as pumps of a pump stage for conveying the process gas through the intermediate space. The mutually oppositely disposed surfaces of the motor stator and of the rotor consequently form a pump stage and can provide an additional pump action directed in the conveying direction of the process gas. A reduction in the suction power of the vacuum pump as a consequence of a gas friction occurring in the intermediate space is avoided by this additional pump action. The disturbing gas friction is instead replaced with an interaction acting as a pump with the process gas and thus facilitating the suction power of the pump. A vacuum pump can thereby be provided which is inexpensive to manufacture and compact and which has a high suction power with a gas conduction extending through the motor space.

In this embodiment, the at least one gas path leads through the intermediate space and through the pump stage which is formed by the surfaces bounding the intermediate space. In addition, at least one further gas path can be provided which, as described above, leads past the intermediate space.

At least one of the surfaces acting as pumps is preferably configured as structured. The other surface acting as a pump can be configured as smooth. Both surfaces acting as pumps can also be configured as structured. The one surface acting as a pump can be formed by a core of the motor stator or its radial inner surface. The other surface acting as a pump can be formed by the radial outer surface of the rotor shaft, by the radial outer surface of a permanent magnet arrangement of the drive motor arranged on the rotor shaft and/or by the radial outer surface of an encapsulation surrounding the permanent magnet arrangement at the radially outer side and sealing the permanent magnet arrangement with respect to the intermediate space.

The pump stage is preferably configured as a Holweck pump stage, a threaded pump stage or as a cross-thread or double cross-thread pump stage—

At least one surface acting as a pump can comprise one or more passages which extend spirally about the axis of rotation in the axial direction and which preferably form Holweck passages. With a Holweck pump stage the Holweck passages can be formed in the surface acting as a pump of the stator and the oppositely disposed surface acting as a pump of the rotor can be configured as smooth. With a threaded pump stage the Holweck passages can be arranged in the surface acting as a pump of the rotor and the oppositely disposed surface acting as a pump can be configured as smooth. Both surfaces acting as pumps can also have such spiral passages in order e.g. to form a cross-thread or double cross-thread pump stage. The motor gap can be configured as a sealing gap, in particular as a radial sealing gap, of the pump stage, for example as a Holweck gap.

The vacuum pump preferably has an electric motor as the drive motor. The motor can be a brushless DC current motor or an asynchronous motor. The motor stator can comprise a core which preferably at least regionally and in particular completely comprises a magnetic, in particular a soft magnetic, and/or metallic material. The motor stator can comprise one or more coils which are preferably supported by the core and are fixed, for example, in grooves of the motor stator which can be provided at the radial inner side of the motor stator. The core can have a plurality of disks stacked on one another and can be configured, for example, as a sheet metal package.

The vacuum pump comprises one or more process gas pump stages which convey the process gas from the pump inlet to the pump outlet. The vacuum pump can, for example, be a turbomolecular pump which comprises one or more turbomolecular pump stages. The vacuum pump can, alternatively or additionally, comprise one or more Holweck pump stages, one or more threaded pump stages, one or more cross-thread or double cross-thread pump stages, one or more side channel pump stages, one or more Gaede pump stages and/or one or more Siegbahn pump stages as the process gas pump stages. The vacuum pump can also be a composite vacuum pump in which different types of the above-described pump stages are combined with one another.

The rotor of the vacuum pump can comprise a rotor shaft which can be rotatably supported about the axis of rotation. The rotor shaft preferably forms the armature of the drive motor. The rotor can have a permanent magnet arrangement which is arranged on the rotor shaft and which has one or more pole pairs which are arranged in the magnetic influence region of the motor stator, with the poles of a pair being mutually oppositely disposed, preferably in the radial direction. The rotor can moreover have an encapsulation for the permanent magnet arrangement which surrounds the permanent magnet arrangement at the radial outer side and which seals the permanent magnet arrangement with respect to the intermediate space and the process gas present therein to prevent any damage to the permanent magnet arrangement by the process gas.

The rotor, which in particular rotates fast, preferably comprises the rotor shaft and the rotor members of one or more process gas pump stages which can be configured in one part with the rotor shaft or which can be connected to the rotor shaft as separate parts. In the embodiment described above having an additional Siegbahn pump stage for conveying the process gas into the motor space, the rotor member of the Siegbahn pump stage, which can be identical to the rotor member of a process gas pump stage in accordance with the above description, is preferably likewise configured in one part with the rotor shaft or is connected to the rotor shaft as a separate part.

The invention will be described below by way of example with reference to advantageous embodiments and to the enclosed Figures.

DETAILED DESCRIPTION OF THE PREFERRED EMBODIMENTS

Figure 1:
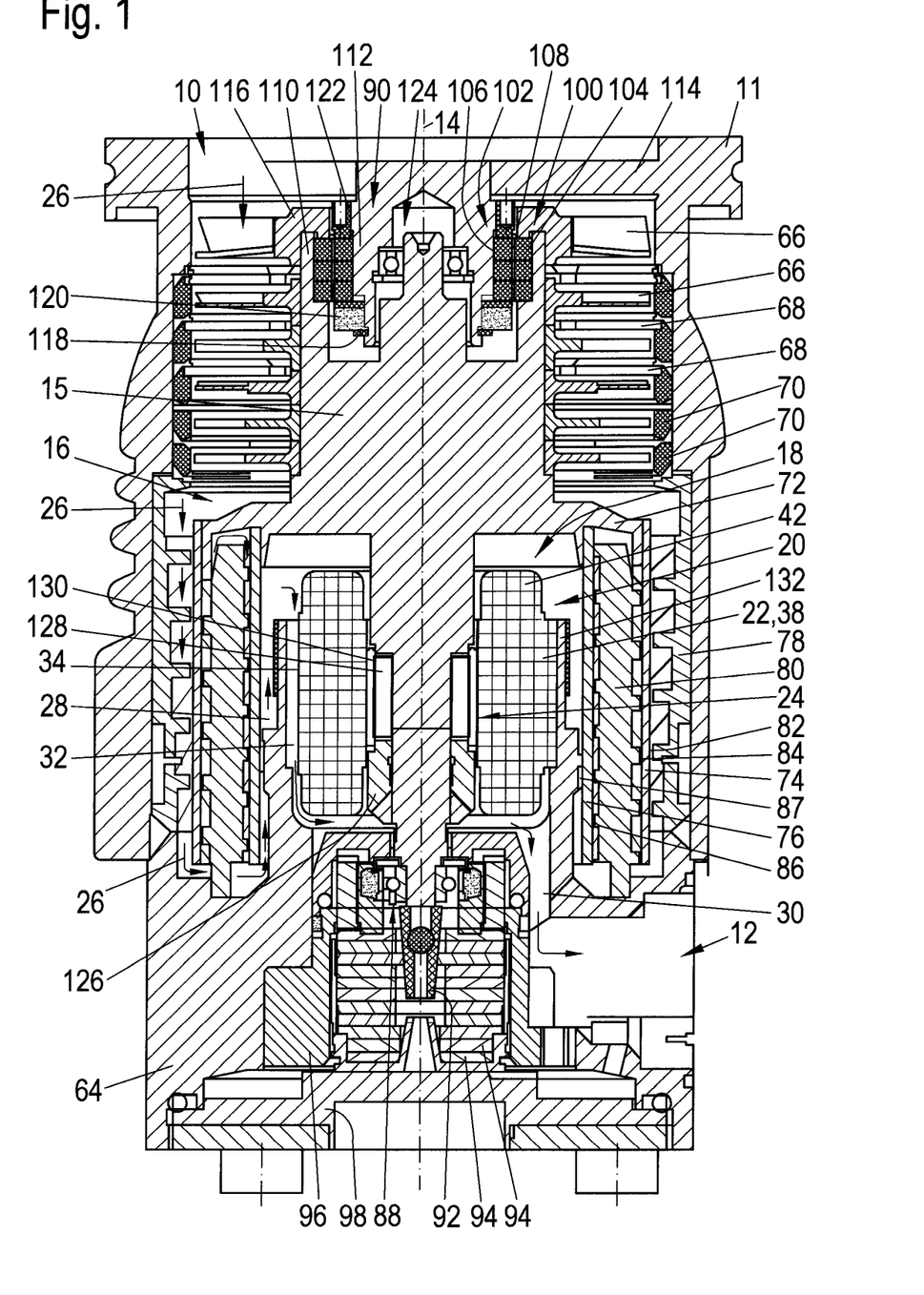
FIG. 1 a cross-sectional view of a vacuum pump in accordance with an embodiment of the invention.

The vacuum pump shown in FIG. 1 comprises a pump inlet 10 surrounded by an inlet flange 11 and a pump outlet 12 as well as a plurality of process gas pump stages for conveying the process gas present at the pump inlet 10 to the pump outlet 12. The vacuum pump comprises a housing 64 and a rotor 16 arranged in the housing 64 and having a rotor shaft 15 rotatably supported about the axis of rotation 14.

The pump in the present embodiment is configured as a turbomolecular pump and comprises a plurality of turbomolecular pump stages acting as pumps, connected to one another in series and having a plurality of radial rotor disks 66 fastened to the rotor shaft 15 and having stator disks 68 arranged between the rotor disks 66 and fixed in the housing 64, with a rotor disk 66 and an adjacent stator disk 68 each forming a turbomolecular pump stage. The stator disks 68 are obtained by spacer rings 70 at a desired axial spacing from one another.

The vacuum pump additionally comprises four Holweck pump stages arranged in one another in a radial direction and connected to one another in series in a manner acting as pumps. The rotor of the Holweck pump stages comprises a rotor hub 72 configured in one part with the rotor shaft 15 and two Holweck rotor sleeves 74, 76 which are fastened to the rotor hub 72, which are supported by it, which are of cylinder jacket shape, which are orientated coaxially to the axis of rotation 14 and which are nested in one another in a radial direction. Furthermore, two Holweck stator sleeves 78, 80 are provided which are of cylinder jacket shape, which are likewise orientated coaxially to the axis of rotation 14 and which are nested in one another in a radial direction. A third Holweck stator sleeve is formed by a reception section 132 of the housing 64 which serves in the manner described below for the reception and fixing of the drive motor 20.

The surfaces acting as pumps of the Holweck pump stages are formed by the jacket surfaces, i.e. by the radial inner and outer surfaces of the Holweck rotor sleeves 74, 76, of the Holweck stator sleeves 78, 80 and of the reception section 132. The radial inner surface of the outer Holweck stator sleeve 78 is disposed opposite the radial outer surface of the outer Holweck rotor sleeve 74 while forming a radial Holweck gap 82 and forms the first Holweck pump stage with it. The radial inner surface of the outer Holweck stator sleeve 74 is disposed opposite the radial outer surface of the inner Holweck rotor sleeve 80 while forming a radial Holweck gap 84 and forms the second Holweck pump stage with it. The radial inner surface of the inner Holweck stator sleeve 80 is disposed opposite the radial outer surface of the inner Holweck rotor sleeve 76 while forming a radial Holweck gap 86 and forms the third Holweck pump stage with it. The radial inner surface of the inner Holweck stator sleeve 76 is disposed opposite the radial outer surface of the reception section 132 while forming a radial Holweck gap 87 and forms the fourth Holweck pump stage with it.

The above-named surfaces acting as pumps of the Holweck stator sleeves 78, 80 and of the reception section 132 each have a plurality of Holweck grooves extending spirally about the axis of rotation 14 in the axial direction, whereas the oppositely disposed jacket surfaces of the Holweck rotor sleeves 74, 76 are smooth and propel the gas into the Holweck grooves in the operation of the vacuum pump.

A roller element bearing 88 is provided in the region of the pump outlet 12 and a permanent magnet bearing 90 is provided in the region of the pump inlet 10 for the rotatable support of the rotor shaft 15.

In the region of the roller element bearing 88, a conical splash nut 92 is provided which has an outer diameter increasing toward the roller element bearing 88. The splash nut 92 is in sliding contact with at least one wiper of an operating medium store. The operating medium store comprises a plurality of absorbent disks 94 which are stacked on one another and which are saturated with an operating medium for the roller element bearing 88, for example with a lubricant. In the operation of the vacuum pump, the operating medium is transferred by capillary action from the operating medium store via the wiper to the rotating splash nut 92 and is conveyed as a consequence of the centrifugal force along the splash nut 92 in the direction of the outer diameter of the splash nut 92, which becomes larger, toward the roller element bearing 88, where it e.g. satisfies a lubricating function. The roller element bearing 88 and the operating medium store are encompassed by a tub-shaped insert 96 and by a cover element 98 of the vacuum pump.

The permanent magnet bearing comprises a bearing half 100 at the rotor side and a bearing half 102 at the stator side which each comprise a ring stack of a plurality of permanently magnetic rings 104 and 106 respectively stacked on one another in the axial direction. The magnetic rings 104, 106 are disposed opposite one another while forming a radial bearing gap 108, with the magnetic rings 104 at the rotor side being arranged radially outwardly and the magnetic rings 106 at the stator side being arranged radially inwardly. The magnetic field present in the bearing gap 108 causes magnetic repulsion forces between the magnetic rings 104, 106 which effect a radial support of the rotor shaft 15.

The magnetic rings 104 at the rotor side are carried by a carrier section 110 of the rotor shaft, the carrier section surrounding the magnetic rings 104 at the radially outer side. The magnetic rings at the stator side are carried by a carrier section 112 at the stator side which extends through the magnetic rings 106 and is suspended at radial struts 114 of the housing 64. The magnetic rings 104 at the rotor side are fixed in parallel with the axis of rotation 14 in the one direction by a cover element 116 coupled to the carrier section 110 and in the other direction by a radially projecting shoulder section of the carrier section 110. The magnetic rings 106 at the stator side are fixed in the one direction in parallel with the axis of rotation 14 by a fastening ring 118 connected to the carrier section 112 and by a compensation element 120 arranged between the fastening ring 118 and the magnetic rings 106 and are fixed in the other direction by a support ring 122 connected to the carrier section 112.

An emergency bearing or safety bearing 124 is provided within the magnetic bearing; it idles in the normal operation of the vacuum pump without contact and only moves into engagement on an excessive radial deflection of the rotor 16 relative to the stator to form a radial abutment for the rotor 16 which prevents a collision of the structures at the rotor side with the structures at the stator side. The safety bearing 124 is configured as a non-lubricated roller element bearing and forms a radial gap with the rotor 16 and/or the stator, said gap having the effect that the safety bearing 124 is out of engagement in normal pump operation. The radial deflection at which the safety bearing 124 comes into engagement is dimensioned sufficiently large that the safety bearing 124 does not move into engagement in the normal operation of the vacuum pump and is simultaneously small enough that a collision of the structures at the rotor side with the structures at the stator side is avoided under all circumstances.

The vacuum pump comprises a drive motor 20 for the rotating driving of the rotor 16. The details of the drive motor 20 and of the surrounding pump components can be recognized particularly easily in FIG. 2. The drive motor 20 comprises a motor stator 22 having a core 38 and having one or more coils 42 which are only shown schematically in FIG. 1 and which are fixed in grooves of the core 38 provided at the radial inner side of the core 38.

Figure 2:
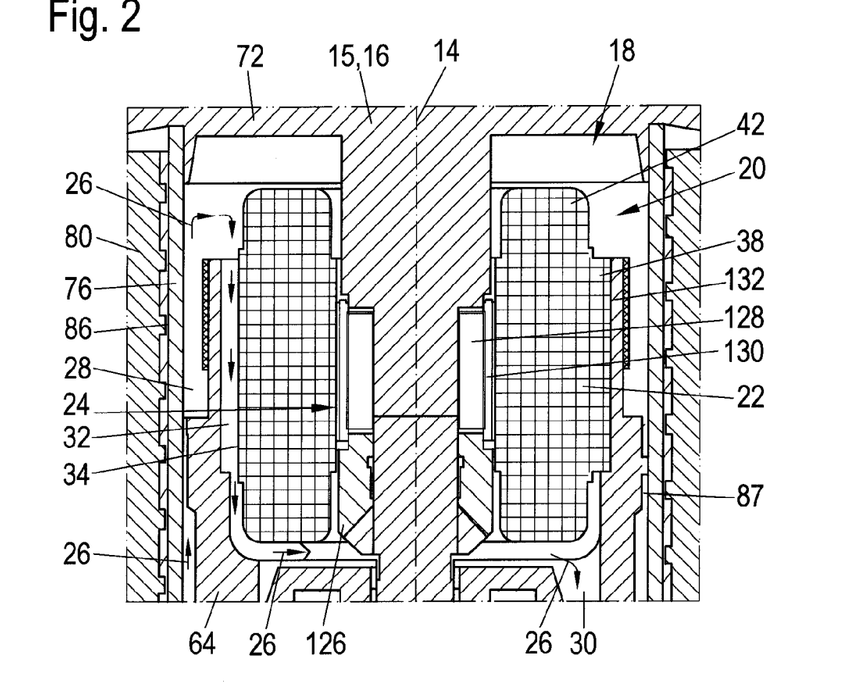
FIG. 2. a cross-sectional view of a section of the vacuum pump shown in FIG. 1.

The armature of the drive motor 20 is formed by the rotor 16 whose rotor shaft 15 extends through the motor stator 22. A permanent magnet arrangement 128 is fixed at the radial outer side on the section of the rotor shaft 15 extending through the motor stator 22. An intermediate space 24 which comprises a radial motor gap via which the motor stator 22 and the permanent magnet arrangement 128 have a magnetic influence for transferring the drive torque is arranged between the motor stator 22 and the section of the rotor 16 extending through the motor stator 22.

The permanent magnet arrangement 128 is fixed at the rotor shaft 15 in the axial direction by a fastening sleeve 126 plugged onto the rotor shaft 15. An encapsulation 130 surrounds the permanent magnet arrangement 128 at its radial outer side and seals it with respect to the intermediate space 24.

The motor stator 22 is fixed in the housing 64 by a reception section 132 which is fixed to the housing, which surrounds the motor stator 22 at the radial outer side and which supports the motor stator 22 in the radial and axial directions. The reception section 132 bounds together with the rotor hub 72 a motor space 18 in which the drive motor 20 is received.

The motor space 18 has an inlet 28 arranged on the one side of the intermediate space 24 and connected in a gas-conducting manner to the inwardly disposed fourth Holweck pump stage and an outlet 30 arranged at the oppositely disposed side of the intermediate space 24 and connected in a gas-conducting manner to the pump outlet 12.

The core 38 of the motor stator 22 has at its radial outer side in the region shown at the left in FIGS. 1 and 2 a cut-out 34 which forms together with the adjacent region of the reception section 132 a passage 32 through which the process gas conveyed into the motor space 18 can be conveyed past the intermediate space 24 from the inlet 28 to the outlet 30.

The gas path on which the process gas moves from the pump inlet 10 to the pump outlet 12 is illustrated by arrows 26 in FIGS. 1 and 2. The process gas is conveyed, starting from the pump inlet 10, first in order through the turbomolecular pump stages and then in order through the four Holweck pump stages. The gas exiting the fourth Holweck pump stage enters into the motor space 18 and is conveyed from the inlet 28 of the motor space 18 through the passage 32 to the outlet 30 of the motor space 18 and to the pump outlet 12.

Figure 3:
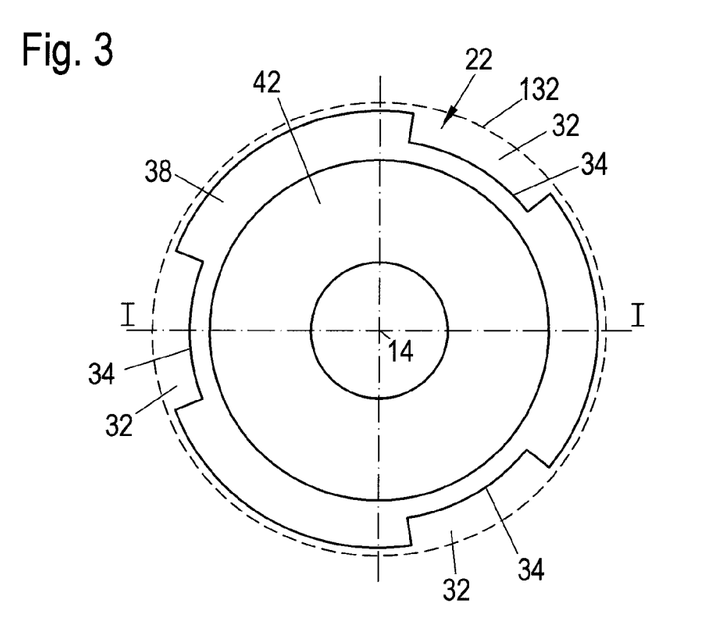
FIG. 3 a plan view of the motor stator of the vacuum pump shown in FIGS. 1 and 2.

FIG. 3 shows the motor stator 22 of the drive motor 20 shown in FIGS. 1 and 2 in an axial plan view. The reception section 132 is shown by dashed lines in FIG. 3. The sectional plane corresponding to the representation of FIGS. 1 and 2 is marked by the line I-I in FIG. 3.

As shown in FIG. 3, the core 38 of the motor stator 22 has three cut-outs 34 at its radial outer side which each form a passage 32 as shown in FIGS. 1 and 2 together with a respective adjacent region of the reception section 132 in the installed state, through which passage the process gas moves from the inlet 28 past the intermediate space 24 of the motor to the outlet 30 of the motor space. The cut-outs 34 are each formed by grooves entering into the motor stator 22 in the radial direction and orientated in the axial direction.

As can be seen from FIG. 3, the three passages 32 are distributed evenly over the periphery of the motor stator 22 so that a region of the motor stator 22 is always disposed opposite a passage 32 in the radial direction in which region no cut-out 34 is arranged. The even running of the drive motor 20 is thereby improved.

Figure 4:
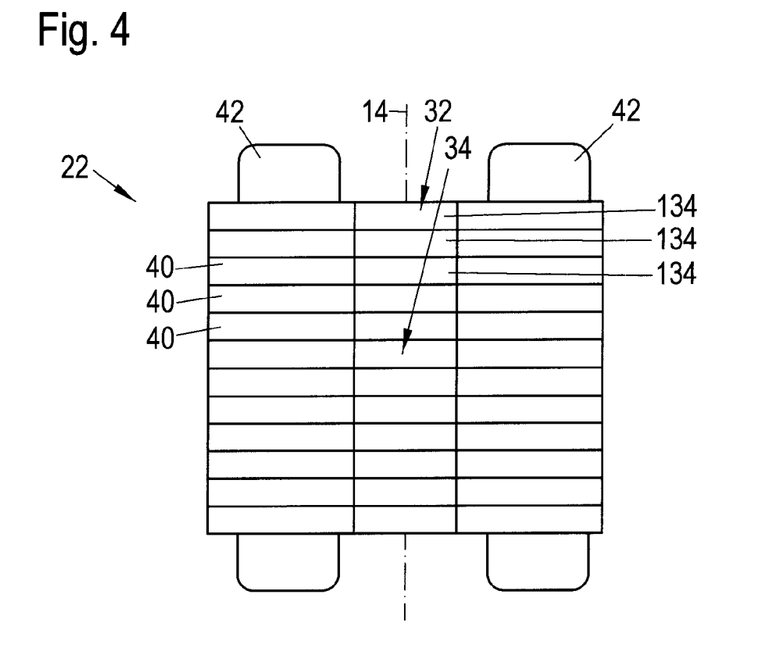
FIG. 4 a side view of the motor stator shown in FIG. 3.

FIG. 4 shows the motor stator 22 shown in FIGS. 1 to 3 in a side view. As FIG. 4 shows, the core 38 of the motor stator 22 comprises a plurality of disks 40 which are stacked on one another in the axial direction and which have a respective cut-out 134 for each passage 32 at their radial outer sides, with the individual cut-outs 124 being aligned with one another for forming the cut-out 34 of the motor stator 22.

Figure 5:
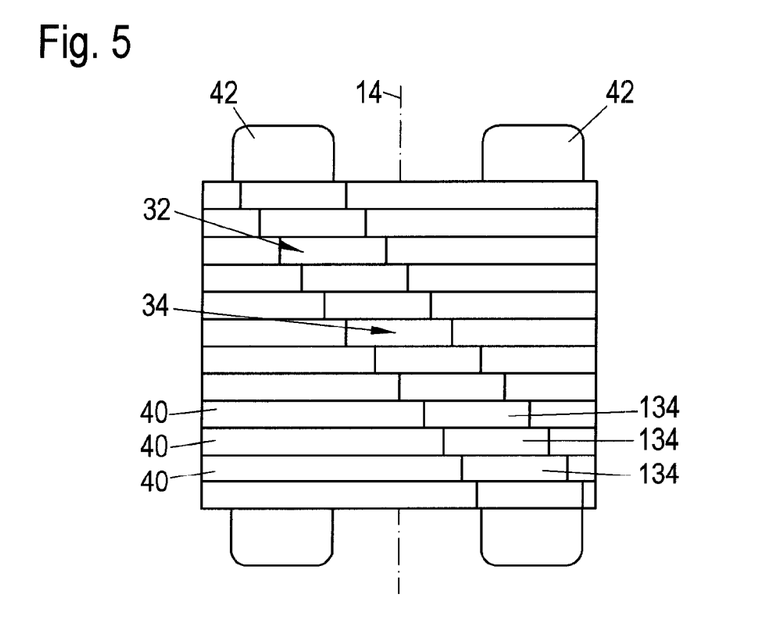
FIG. 5 a side view of an alternative motor stator.

FIG. 5 shows an alternative motor stator 22 which can be used in the vacuum pump shown in FIGS. 1 and 2 instead of the motor stator 22 shown in FIGS. 3 and 4. With the exception of the special features described below, the motor stator 22 shown in FIG. 5 corresponds to the motor stator 22 shown in FIG. 4.

Whereas the cut-outs 134 shown in FIG. 4 are aligned with one another in the axial direction, the cut-outs 134 of the individual disks 40 which follow one another in the motor stator 22 shown in FIG. 5 are arranged with an angular offset to one another in the peripheral direction. The cut-outs 134 are thus aligned with one another in a direction oblique to the axis of rotation 14 and form a cut-out 34 which is orientated obliquely to the axis of rotation 14 and a passage 32 which is orientated obliquely to the axis of rotation 14. The cut-out 34 is consequently distributed over a larger region of the periphery of the motor stator 22, whereby the even running of the motor is improved. The motor stator 22 shown in FIG. 5 also comprises three cut-outs 34 which are distributed evenly over the periphery of the motor stator 22 and which are configured in the above-described manner.

Figure 6:
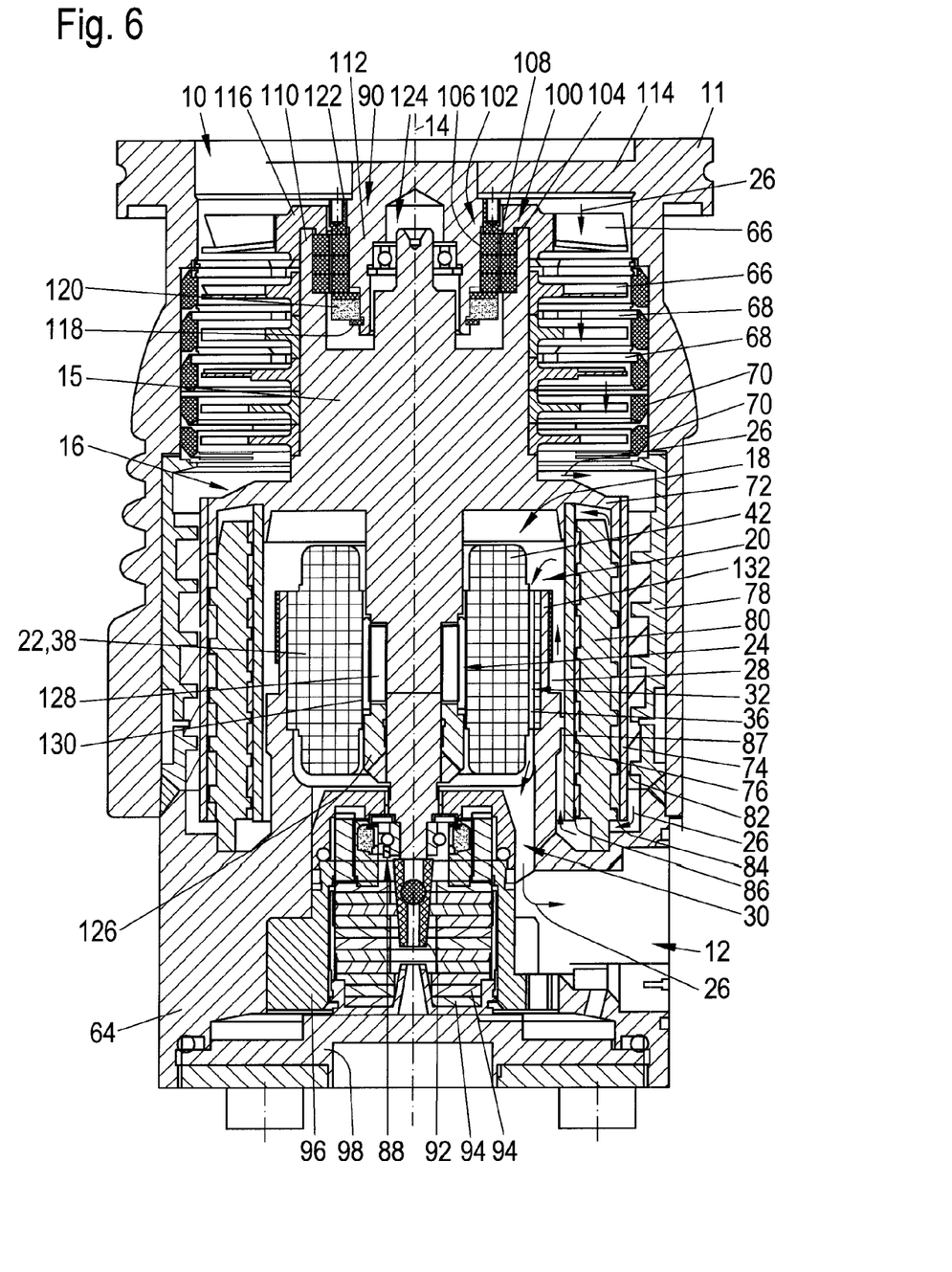
FIG. 6 a cross-sectional view of a vacuum pump in accordance with a further embodiment of the invention.
Figure 7:
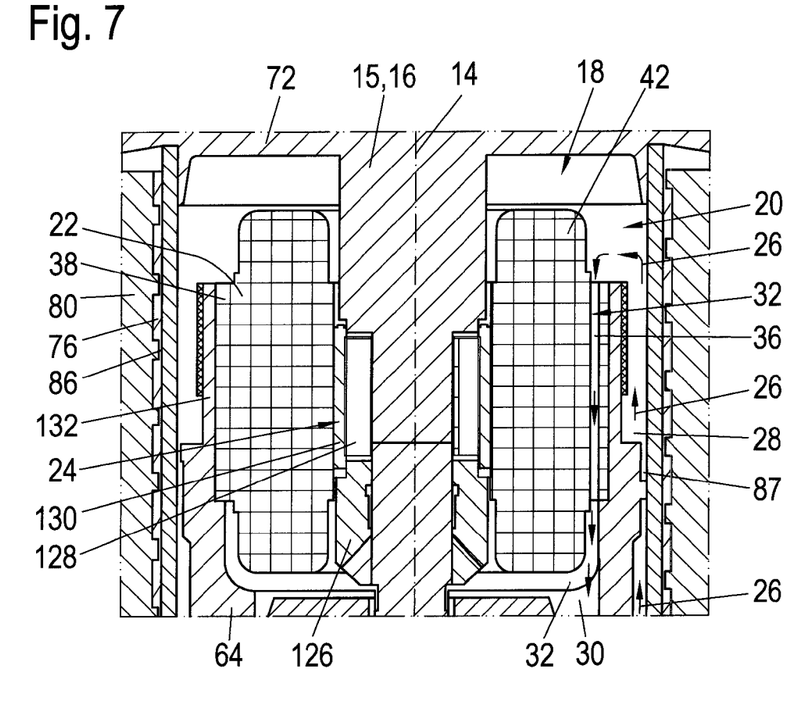
FIG. 7 a cross-sectional view of a section of the vacuum pump shown in FIG. 6.

FIGS. 6 and 7 show a vacuum pump in accordance with a further embodiment of the invention which corresponds to the vacuum pump shown in FIGS. 1 and 2 with the exception of the special features explained in detail in the following. In principle, identical or mutually corresponding components are provided with the same reference numerals in all Figures.

In the vacuum pump shown in FIGS. 6 and 7, the motor stator 22 comprises instead of cut-outs 34 which together with adjacent regions of the reception section 132 each bound a passage 32, openings 36 which pass through the motor stator 22 and having a closed cross-section and which each bound a passage 32 through which the gas can be conveyed from the inlet 28 past the intermediate space 24 to the outlet 30 of the motor space 18.

Figure 8:
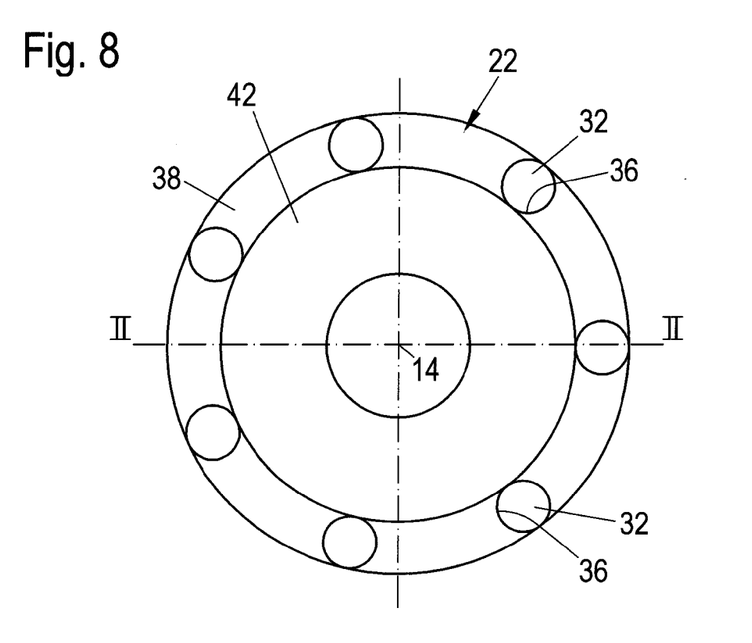
FIG. 8 a plan view of the motor stator of the vacuum pump shown in FIGS. 6 and 7

FIG. 8 shows the motor stator 22 of the drive motor 20 shown in FIGS. 6 and 7 in an axial plan view. The sectional plane corresponding to the representation of FIGS. 6 and 7 is marked by the line II-II in FIG. 8. As shown in FIG. 8, the motor stator 22 has a total of seven throughgoing closed openings 36 which each bound a passage 32 for the process gas. The openings 36 are evenly distributed over the periphery of the motor stator 22 so that due to the odd number of openings 36 a section of the motor stator 22 without an opening 36 is disposed opposite each opening 36 in the radial direction, whereby the even running of the drive motor 20 is improved.

Figure 9:
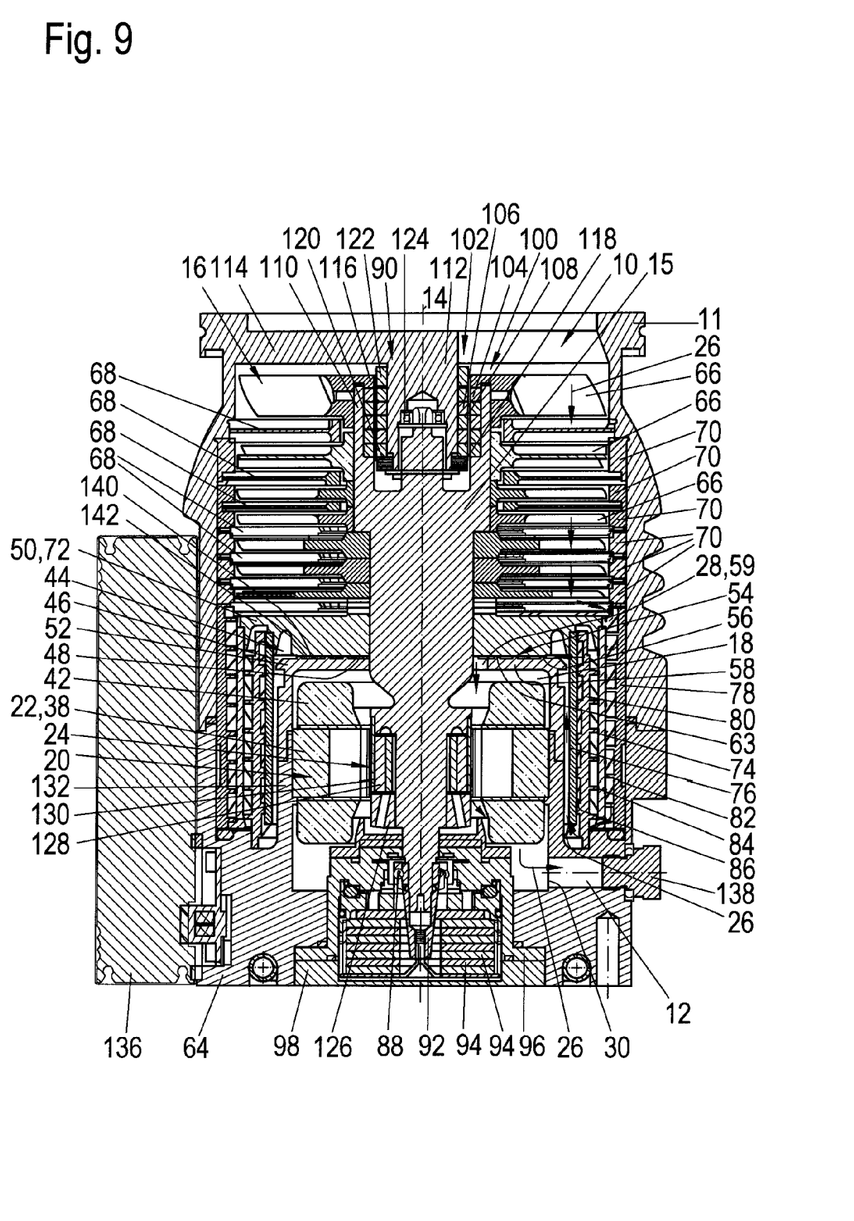
FIG. 9 a cross-sectional view of a vacuum pump in accordance with a still further embodiment of the invention.

FIG. 9 shows a vacuum pump in accordance with a further embodiment of the invention which substantially corresponds to the vacuum pumps shown in FIGS. 1, 2 6 and 7 with the exception of the special features described below. An electronic control unit 136 of the vacuum pump is shown in FIG. 9 with which the drive motor 20 can be controlled. Furthermore, a closure element 138 for the pump outlet 12 is provided which has to be removed before the putting into operation of the vacuum pump.

Figure 10:
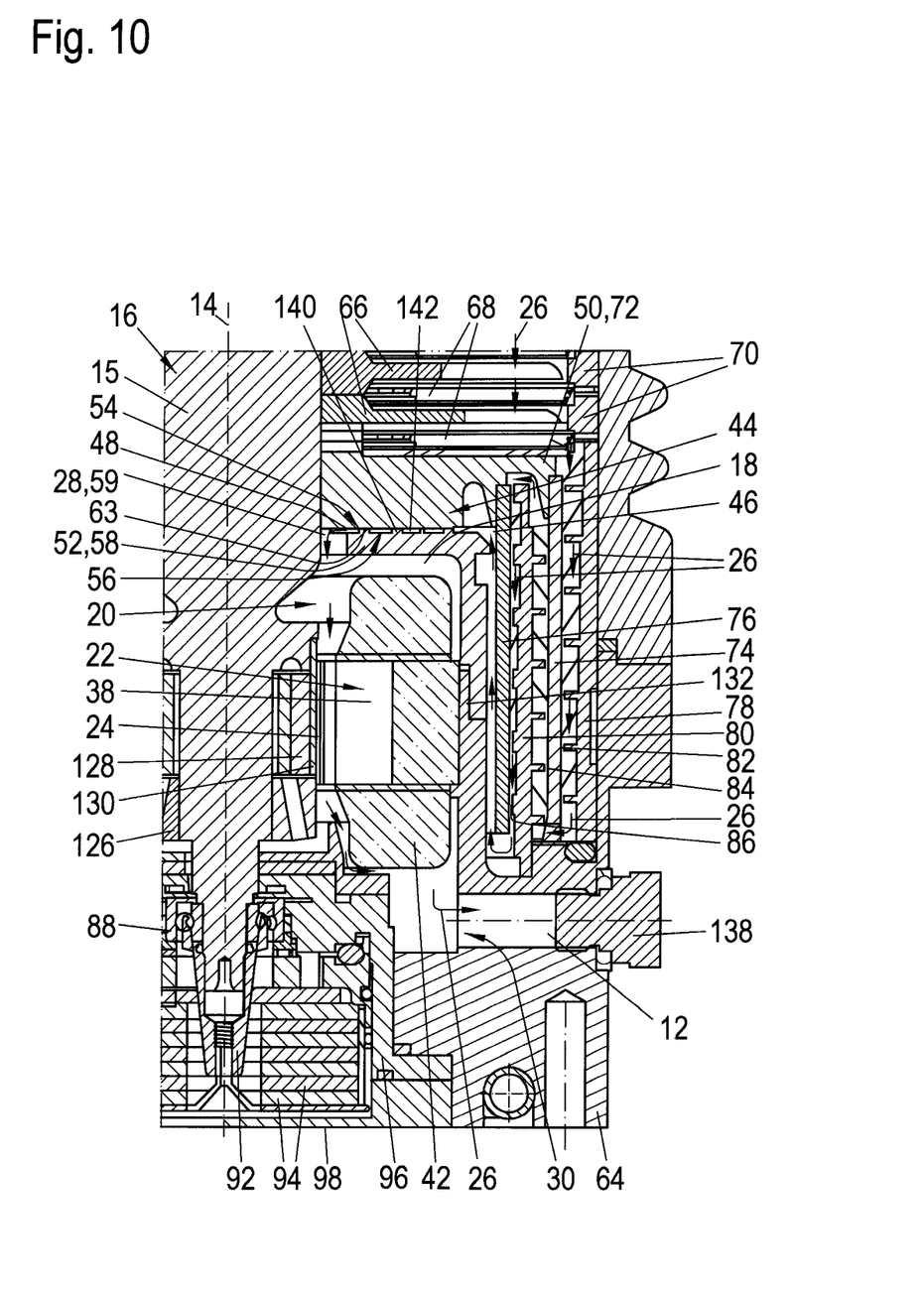
FIG. 10 a cross-sectional view of a section of the vacuum pump shown in FIG. 9.

In the vacuum pump shown in FIGS. 9 and 10, the motor space 18 is separated from the suction space of the vacuum pump by a partition wall 58. The rotor shaft 15 extends through the partition wall 58 while forming a radial gap 59, with the gap 59 simultaneously forming the inlet 28 of the motor space 18. A fourth Holweck pump stage is not provided in the present embodiment, but could equally be present.

The vacuum pump comprises a Siegbahn pump stage 44 arranged within the two Holweck rotor sleeves 74, 76 and having an inlet 46 connected in a gas-conducting manner to the third Holweck pump stage and having an outlet 48 opening into the gap 59 and the process gas can be conveyed by said Siegbahn pump stage from the suction space of the vacuum pump into the motor space 18.

The rotor shaft 72 of the Holweck pump stages which is configured as a separate part rotationally fixedly connected to the rotor shaft 15 in the present embodiment simultaneously forms the rotor member 50 of the Siegbahn pump stage and the partition wall 58 simultaneously forms the stator member 52 of the Siegbahn pump stage 44. The rotor member 50 and the stator member 52 each form one of two surfaces 54, 56 acting as pumps of the Siegbahn pump stage 44 which are disposed opposite one another while forming an axial sealing gap 63 and which are orientated substantially radially with respect to the axis of rotation 14. The surface 54 acting as a pump of the rotor member 50 is in this respect smooth, whereas the surface 56 acting as a pump of the stator member 52 is structured.

The surface 54 acting as a pump of the stator member 52 comprises an elevated portion 140 which bounds a conveying passage 142 of the Siegbahn pump stage which extends spirally in a radial plane from the inlet 46 at the radially outer side to the outlet 48 of the Siegbahn pump stage 44 at the radially inner side and in which the process gas is propelled in the operation of the vacuum pump.

In the operation of the vacuum pump shown in FIGS. 9 and 10, the process gas is conveyed in accordance with the arrows 26 in order through the turbomolecular pump stages, through the three Holweck pump stages and through the Siegbahn pump stage 44 into the motor space 18. The gas conveyed into the motor space 18 is conveyed in the present embodiment through the intermediate space 24 to the outlet 30 of the motor space 18. Alternatively, passages could also be provided in this embodiment which are bounded by the motor stator 22 and through which the process gas can be conveyed from the inlet 28 past the intermediate space 24 to the outlet 30 of the motor space 18.

The vacuum pumps show in FIGS. 1 to 10 can additionally be modified such that the mutually oppositely disposed surfaces of the motor stator 22 and of the rotor 16, which bound the intermediate space 24, form a structure acting as a pump for the active conveying of the process gas through the intermediate space 24. The suction performance of the pump can thereby be increased still further. Such an embodiment of a vacuum pump is furthermore also possible independently of the embodiments show in FIGS. 1 to 10.

What is claimed is:

1. A vacuum pump having:
   a pump inlet (10), a pump outlet (12) and a pump rotor (16) including a rotor hub (72) that is rotatable about an axis of rotation (14),
   a housing (64) having a cylindrical reception portion (132) that extends towards the rotor hub,
   at least one process gas pump stage for conveying a process gas present at the pump inlet (10) from the pump inlet (10) to the pump outlet (12),
   a motor space (18) bounded by the cylindrical reception portion (132) and the rotor hub (72), and a drive motor (20) arranged in the motor space (18), the drive motor (20) comprising a motor stator (22) and being configured for rotationally driving the pump rotor (16),
   wherein at least one gas path for the conveyance of the process gas is provided from the pump inlet (10) to the pump outlet (12) which leads through the motor space (18) and leads at least sectionally along the motor stator (22) or through the motor stator (22), and wherein an intermediate space (24) is provided between the motor stator (22) and the pump rotor (16), with the at least one gas path extending outside of the intermediate space (24), and
   wherein one or more passages are formed in the cylindrical reception portion (132) through which the at least one gas path extends outside of the intermediate space (24).

2. The vacuum pump in accordance with claim 1, wherein the one or more passages are bounded over a part of their periphery by the motor stator (22), with the one or more passages (32) being bounded by a cut-out (34) of the motor stator (22); or wherein the one or more passages are bounded over their total periphery by the motor stator (22), with the one or more passages being bounded by an opening (36) of the motor stator (22).

3. The vacuum pump in accordance with claim 2, wherein the motor stator (22) has a core (38) and at least one coil (42) carried by the core (38), wherein the core (38) comprises a plurality of disks (40) stacked on one another, with the one or more passages (32) being bounded by cut-outs (134) or openings of the disks (40).

4. The vacuum pump in accordance with claim 2, wherein the one or more passages (32) are configured and/or arranged such that a substantially uniform drive torque can be generated by the drive motor (20) over the total angle of rotation with respect to the axis of rotation (14).

5. The vacuum pump in accordance with claim 2, wherein a region of the motor stator (22) in which no passage (32) is arranged is disposed opposite a respective passage in the one or more passages in the radial direction; and/or wherein an odd number of the one or more passages (32) is provided and the odd number of the one or more passages (32) is distributed over the periphery of the motor stator (22); and/or
wherein the one or more passages is oriented at least over a part of its length inclined with respect to the axis of rotation (14) of the drive motor (20).

6. The vacuum pump in accordance with claim 5, wherein the region of the motor stator (22) in which no passage (32) is arranged is disposed opposite each respective passage (32) in the radial direction.

7. The vacuum pump in accordance with claim 5, wherein the odd number of one or more passages (32) is provided and the one or more passages (32) are substantially distributed uniformly over the periphery of the motor stator (22).

8. The vacuum pump in accordance with claim 5, wherein each respective passage (32) is oriented at least over a part of its length inclined with respect to the axis of rotation (14) of the drive motor (20).

9. The vacuum pump in accordance with claim 5, wherein each respective passage (32) is oriented over its total length inclined with respect to the axis of rotation (14) of the drive motor (20).

10. The vacuum pump in accordance with claim 1, further comprising at least one seal for the fluid-tight sealing of the intermediate space (24).

11. The vacuum pump in accordance with claim 1, further comprising a Siegbahn pump stage (44) which is configured for conveying the process gas into the motor space (18).

12. The vacuum pump in accordance with claim 11, wherein the Siegbahn pump stage has an inlet (46) connected in a gas-conducting manner to the at least one process gas pump stage and has an outlet (48) connected in a gas-conducting manner to the motor space (18).

13. The vacuum pump in accordance with claim 11, wherein the Siegbahn pump stage (44) comprises a rotor member (50) and a stator member (52).

14. The vacuum pump in accordance with claim 13, wherein the rotor member (50) and the stator member (52) each form a surface (54, 56) acting as a pump of the Siegbahn pump stage (44).

15. The vacuum pump in accordance with claim 13, wherein the rotor member (50) simultaneously forms a rotating member of the process gas pump stage and is configured as a part of a process gas pump stage configured as a turbomolecular pump stage or as the rotor hub (72) of a process gas pump stage configured as one of a Holweck pump stage, a threaded pump stage, a cross-thread pump stage and a double cross-thread pump stage.

16. The vacuum pump in accordance with claim 13, wherein the stator member (52) of the Siegbahn pump stage (44) is carried by a partition wall (58) connected to the cylindrical reception portion bounding the motor space (18) or is formed by the partition wall (58) connected to the cylindrical reception portion.

17. The vacuum pump in accordance with claim 11, wherein the Siegbahn pump stage (44) is configured to convey the process gas into the motor space (18) through a gap (59) formed between the rotor (16) and a partition wall (58) connected to the cylindrical reception portion bounding the motor space (18).

18. The vacuum pump in accordance with claim 1, further comprising surfaces of the motor stator (22) and surfaces of the pump rotor (16) which are disposed opposite one another and which bound the intermediate space (24), form surfaces acting as pumps of a pump stage for conveying the process gas through the intermediate space (24).

19. The vacuum pump in accordance with claim 18, wherein the pump stage is configured as one of a Holweck pump stage, a threaded pump stage, a cross-thread pump stage and a double cross-thread pump stage.

20. The vacuum pump in accordance with claim 18, wherein the at least one gas path is a second one of two gas paths that extend through the motor space, and the first one of the at least two gas paths extends from an inlet (28) located radially outside the cylindrical reception portion through the intermediate space (24) to an outlet (30) formed in the housing (64) and the second one of the at least two gas paths extends from the inlet (28) outside of the intermediate space (24) to the outlet (30) formed in the housing (64).

* * * * *